United States Patent [19]
Perkins

[11] 3,788,698
[45] Jan. 29, 1974

[54] SEAT RECLINE MECHANISM

[75] Inventor: Norman W. Perkins, Benfleet, England

[73] Assignee: Ford Motor Company, Dearborn, Mich.

[22] Filed: May 8, 1972

[21] Appl. No.: 251,310

[30] Foreign Application Priority Data
Nov. 26, 1971 Great Britain.................... 54,934/71

[52] U.S. Cl...................... 297/373, 16/139, 297/367
[51] Int. Cl.......................... B60m 1/02, E05d 11/10
[58] Field of Search............................. 16/146, 139; 297/366–370, 373

[56] References Cited
UNITED STATES PATENTS
2,784,770    3/1957    Herr................................... 297/367
3,471,892   10/1969    Resag et al. ...................... 16/146 X
3,058,148   10/1962    Beierbach et al............... 297/369 X

*Primary Examiner*—Casmir A. Nunberg
*Attorney, Agent, or Firm*—Keith L. Zerschling; John J. Roethel

[57] ABSTRACT

A seat recline mechanism in which a fixed toothed sector connected to a seat back is engaged by a movable toothed locking member mounted on a mounting plate connected to a seat cushion. The teeth of the locking member are of substantially the same pitch as those of the fixed tooth sector and are positioned on an arc having a center of curvature outside the pivotal axes of the sector and the locking member.

5 Claims, 3 Drawing Figures

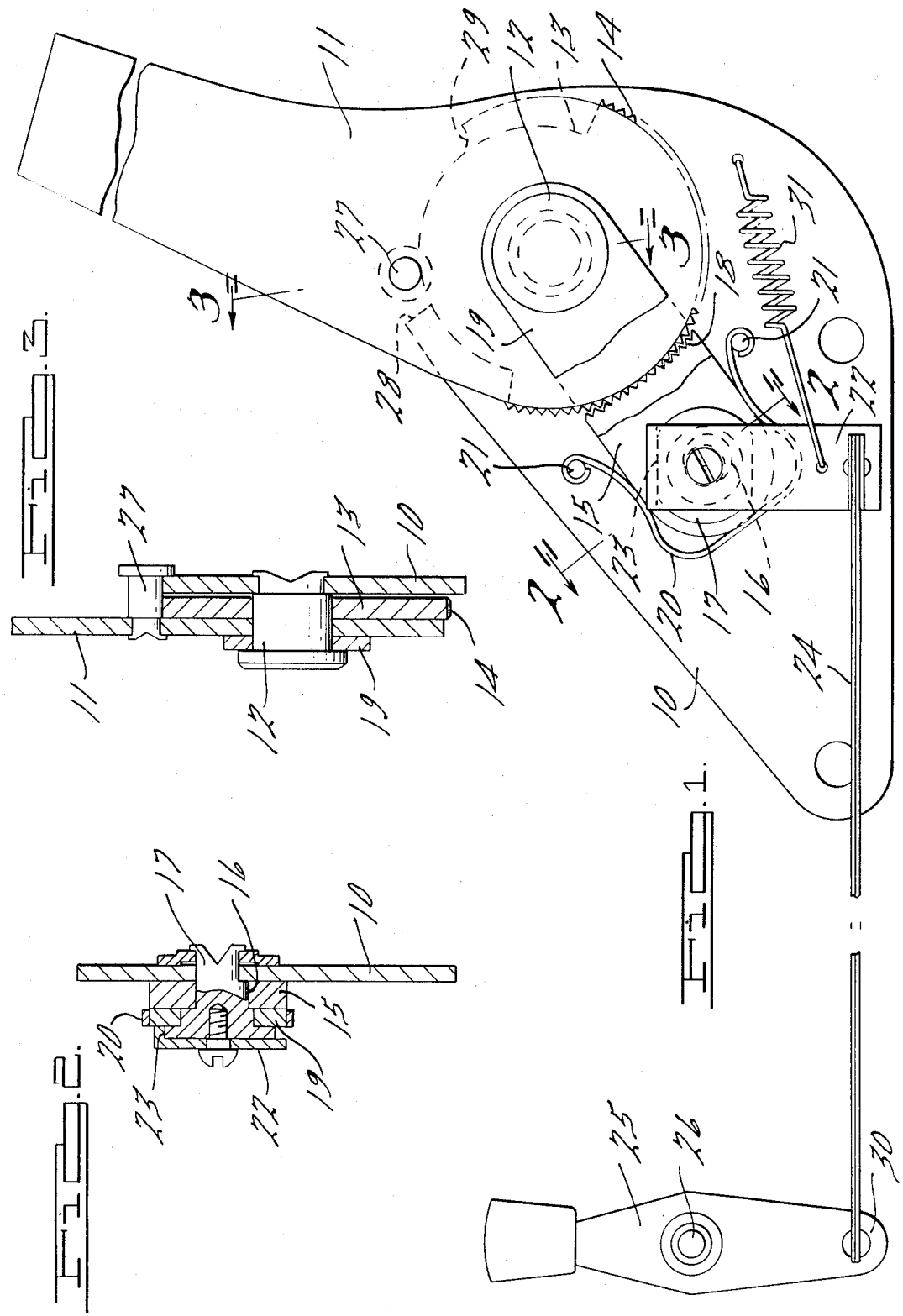

SEAT RECLINE MECHANISM

BACKGROUND OF THE INVENTION

Many seat recline mechanisms function by engagement of a fixed toothed sector by a movable toothed sector or locking member. Each increment of tilting movement of the seat back is a function of the pitch of the meshing teeth on the fixed and movable segments. It has been found that the pitch of the teeth when located on a true pitch circle cannot be reduced below about 2 degrees without producing incomplete meshing of the teeth of the fixed sector with the teeth of the movable locking member. The meshing conditions which occur when the pitch is reduced below 2 degrees can cause excessive wear and eventual failure of the mechanism.

It is an object of the present invention to provide a construction and arrangement in which teeth of less than 2° may be used thereby permitting finer incremental adjustment of the angle of seat backrest inclination.

SUMMARY OF THE INVENTION

According to the present invention the seat back recline mechanism has the following features: A toothed sector is fixed to a seat back mounting plate adapted to be connected to a seat back. A second or seat cushion mounting plate is adapted to be connected to a seat cushion. A pivot means pivotally mounts the sector and the seat back mounting plate on the seat cushion mounting plate. A toothed locking member is supported on a support means for pivotal and bodily shiftable movement relative to the seat cushion mounting plate. The toothed locking member is manually engaged with the fixed sector and is pivotal about an axis substantially parallel to the pivotal axis of the sector. A releasing device is operable to move the pivotal axis of the sector and locking member apart to disengage the teeth of the sector and the teeth of the locking member and permit angular adjustment of the seat back mounting plate and therefore the seat back relative to the seat cushion mounting plate. The teeth of the locking member are of substantially the same pitch as those of the sector and are positioned on an arc having a center of curvature outside the pivotal axes of the sector and the locking member.

DESCRIPTION OF THE DRAWING

Further features and advantages of the present invention will be made more apparent as this description proceeds, reference being had to the accompanying drawing, wherein:

FIG. 1 is a side elevation of a seat recline mechanism embodying the invention;

FIG. 2 is a section on the line 2—2 of FIG. 1; and

FIG. 3 is a section on the line 3—3 of FIG. 1.

DETAILED DESCRIPTION OF THE INVENTION

An inner plate 10 is fixed to a seat cushion frame (not shown). An outer plate 11, bolted to a seat back frame (not shown), is pivotally mounted on the inner plate 10 by a rivet 12.

A sector or disc 13 of sintered material with fine teeth 14 (i.e., of pitch about 1.5° or less) at its periphery is welded to the outer plate 11 concentrically with the rivet 12.

A locking member 15 is mounted on an eccentric hub 16 of a pivot 17 pivotally mounted on the inner plate 10. The locking member 15 has teeth of the same pitch as the teeth of the sector 13 formed on a concave edge 18 having a radius of curvature greater than the radius of sector 13. Alternatively the toothed edge 18 may be straight or convex with a center of curvature at the other side of the pivot 17.

A link 19 connects the outer end of rivet 12 and the outer part of pivot 17 serves to hold the sector 13 and locking member 15 laterally aligned, and also helps to support the rivet 12 and pivot 17 against forces generated at the point of contact of the sector and the locking member which tend to force the rivet 12 and pivot 17 apart. In FIG. 1, part of the link 19 is cut away to expose the engaging portions of the locking member 15 and the sector 13.

A leaf spring 20 mounted at its ends to pins 21 on the inner plate biases the locking plate to a median position in which its concave toothed edge 18 is aligned with the rivet 12 so that initially engagement of the toothed edge with the sector is always at substantially the middle of the toothed edge.

A lever 22 is screw-fastened to the outer end of the pivot 17 and the upper end of this lever is turned over to lie against a flat 23 on the head of the pivot 17 to ensure that the lever 22 remains fast with the pivot 17.

The lower end of the lever 22 is connected by a cable 24 to the lower end 30 of a handle 25 pivotally mounted at 26 to the seat cushion frame (not shown) at a location convenient to the hand of a person seated on the seat.

A tension spring 31 connected between the lever 22 and the inner plate 10 urges the pivot 17 in an anticlockwise direction and the angular position of the eccentric hub 16 relative to the pivot 17 is such that anticlockwise movement of the pivot 17 brings the toothed locking member 15 into engagement with the sector 13. It will be appreciated that during engagement the locking member may move angularly to align itself for meshing engagement with the teeth of the sector 13.

In the engaged position forces applied to the seat either in the forward or rearward direction tend to bring a portion of the locking member of greater distance from the pivot 17 into contact with the sector so that the seat back is prevented from moving appreciably and the contact pressure between toothed locking member 15 and sector 13 is increased.

The mechanism is disengaged for adjustment of the seat back position by pulling the upper end of the handle rearwardly. The lever 22 is then moved in a clockwise direction with the pivot 17 thereby withdrawing the locking member 15 from the sector 13. The seat back is then free for adjustment between angular positions limited by engagement of a rivet 27 fixed to the outer plate 11 with stops 28 and 29 formed on the inner plate 10.

A simple pivot may be mounted at the other side of the seat or a similar recline mechanism may be used. In the latter case levers 22 of the two mechanisms are connected by a cable for movement together when the handle 25 is operated.

It is to be understood that the invention is not limited to the exact construction illustrated and described above, but that various changes and modifications may be made without departing from the spirit and scope of the invention as defined by the following claims.

I claim:

1. A seat recline mechanism having:
a toothed sector fixed to a seat back mounting plate adapted to be connected to a seat back,
a seat cushion mounting plate adapted to be connected to a seat cushion,
pivot means pivotally mounting the sector and the seat back mounting plate on the seat cushion mounting plate,
a toothed locking member,
support means mounting the toothed locking member for pivotal and bodily shiftable movement on the seat cushion mounting plate,
the toothed locking member being manually engaged with the sector and being pivotal about an axis substantially parallel to the pivotal axis of the sector,
and a releasing device operable to move the pivotal axes of the sector and locking member apart to disengage the teeth of the sector and the teeth of the locking member and permit angular adjustment of the seat back mounting plate relative to the seat cushion mounting plate,
wherein the improvement comprises
the teeth of the locking member being of substantially the same pitch as those of the sector and positioned on an arc having a center of curvature outside the pivotal axes of the sector and the locking member.

2. A seat recline mechanism as claimed in claim 1, in which:
a spring means urges the locking member towards an angular position in which its arcuate toothed portion is aligned for meshing engagement with the sector teeth.

3. A seat recline mechanism as claimed in claim 2, in which:
the locking member is mounted on an eccentric hub which is angularly movable to bring the locking member into and out of engagement with the sector.

4. A seat recline mechanism having:
a toothed sector fixed to a seat back mounting plate adapted to be connected to a seat back,
a seat cushion mounting plate adapted to be connected to a seat cushion,
pivot means pivotally mounting the sector and the seat back mounting plate on the seat cushion mounting plate,
a locking member having an arcuate toothed portion,
support means mounting the toothed locking member for pivotal and bodily shiftable movement on the seat cushion mounting plate,
the toothed locking member being manually engaged with the sector and being pivotal about an axis substantially parallel to the pivotal axis of the sector,
and a releasing device operable to move the pivotal axes of the sector and locking member in a direction to disengage the teeth of the locking member from the teeth of the sector to permit angular adjustment of the seat back mounting plate relative to the seat cushion mounting plate,
wherein the improvement comprises:
the arcuate toothed portion of the locking member being concave with a radius of curvature greater than the radius of the toothed sector.

5. A seat recline mechanism as claimed in claim 4, in which:
the locking member is mounted on an eccentric hub which is angularly movable to bring the locking member into and out of engagement with the sector.

* * * * *